(12) United States Patent
Kim et al.

(10) Patent No.: US 9,223,425 B1
(45) Date of Patent: Dec. 29, 2015

(54) TOUCH SENSING DEVICE AND DISPLAY DEVICE USING THE SAME

(71) Applicant: LG Display Co., Ltd., Seoul (KR)

(72) Inventors: Jaeseung Kim, Gyeonggi-do (KR);
Seungrok Shin, Gyeonggi-do (KR);
Jeonghoon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/564,318

(22) Filed: Dec. 9, 2014

(30) Foreign Application Priority Data

Sep. 10, 2014 (KR) ........................ 10-2014-0119603

(51) Int. Cl.
*G06F 3/041* (2006.01)

(52) U.S. Cl.
CPC ...................... *G06F 3/041* (2013.01)

(58) Field of Classification Search
CPC ..... G09G 3/3648; G09G 3/3655; G09G 5/00; G09G 3/36; G06F 3/041
See application file for complete search history.

(56) References Cited

U.S. PATENT DOCUMENTS

| 2006/0145995 | A1  | 7/2006  | Kim et al. |
| 2011/0063233 | A1* | 3/2011  | Chuang et al. ................ 345/173 |
| 2011/0291977 | A1* | 12/2011 | Moriwaki ..................... 345/173 |
| 2012/0287107 | A1* | 11/2012 | Zhao ............................ 345/212 |
| 2013/0335342 | A1  | 12/2013 | Kim et al. |

FOREIGN PATENT DOCUMENTS

| KR | 10-2006-0077951 A | 7/2006 |
| KR | 10-2013-0139679 A | 12/2013 |

* cited by examiner

*Primary Examiner* — Michael Faragalla
(74) *Attorney, Agent, or Firm* — Morgan, Lewis & Bockius LLP

(57) ABSTRACT

A touch sensing device comprises a common electrode divided into a plurality of sensor electrodes, a plurality of sensor lines respectively connected to the plurality of sensor electrodes, a feedback voltage transmitter, and a common voltage compensator. The feedback voltage transmitter includes a feedback line, a plurality of switching elements configured to selectively connect the sensor lines to the feedback line, and a feedback control line configured to control selection of the switching elements. The common voltage compensator is configured to receive a feedback voltage supplied to the sensor lines through the feedback line while the sensor lines are connected to the feedback line through the plurality of switching elements, and compensate the feedback voltage to a reference voltage level.

14 Claims, 15 Drawing Sheets

| MUX1 | Sync1 | Sync2 |
|---|---|---|
| Vcom_ref1 | 0 | 0 |
| Vcom_ref2 | 0 | 1 |
| Vcom_ref3 | 1 | 0 |
| Vcom_ref4 | 1 | 1 |

| MUX2 | Tsync | Th |
|---|---|---|
| ML | 0 | 0 |
| MH | 0 | 1 |
| Vcom_ref | 1 | 0 |

TOUCH SENSING DEVICE AND DISPLAY DEVICE USING THE SAME

This application claims the benefit of Korean Patent Application No. 10-2014-0119603, filed on Sep. 10, 2014, which is incorporated herein in its entirety by reference for all purposes as if fully asset forth herein.

BACKGROUND

1. Field of the Invention

Embodiments of the invention relate to a touch sensing device incorporating touch sensors within a pixel array, and a display device using the same.

2. Discussion of the Related Art

A user interface (UI) is configured so that users are able to communicate with various electronic devices and thus can easily and comfortably control the electronic devices as they desire. Examples of a user interface include a keypad, a keyboard, a mouse, an on-screen display (OSD), and a remote controller having an infrared communication function or a radio frequency (RF) communication function. User interface technologies have continuously expanded to increase users' sensibilities and handling convenience. User interfaces have recently been developed to include touch UI, voice recognition UI, 3D UI, etc.

The touch UI has been used in portable information appliances such as smartphones, and has even expanded to the use of laptop computers, computer monitors, home appliances, and so on. In recent years, a technology for embedding touch sensors in a pixel array of a display panel (hereinafter, "in-cell touch sensor technology") has been proposed. With in-cell touch sensor technology, touch sensors can be installed on a display panel without increasing the thickness of the display panel. These touch sensors may be connected to pixels through parasitic capacitance. In a driving method of the touch sensors, to reduce the mutual influence of the pixels and the touch sensors due to coupling, one frame period may be time-divided into a period for driving the pixels (hereinafter, "display driving period") and a period for driving the touch sensors (hereinafter, "touch sensor driving period").

In-cell touch sensor technology typically uses electrodes connected to the pixels of the display panel as electrodes for the touch sensors. In the in-cell touch technology, for example, a common electrode for supplying a common voltage to the pixels of a liquid crystal display device may be divided and used as the electrodes for the touch sensors. Although the common voltage should be the same for every pixel, the division of the common electrode into electrodes for the touch sensors makes the common voltage non-uniform on a large-sized screen, causing the deterioration of picture quality.

With reference to FIGS. 1 to 3, in the in-cell touch sensor technology, a common electrode COM may be divided into a plurality of sensor electrodes C1 to C4. The sensor electrodes C1 to C4 may each operate as touch sensors having self-capacitance. Sensor lines L1 to L4 may be connected to the sensor electrodes C1 to C4, respectively. The capacitance of the touch sensors may increase when a conductive object, such as a finger, touches the touch screen. Consequently, touch input can be detected by measuring changes in capacitance caused by a touch.

During a display driving period Td, the common voltage Vcom for the pixels may be supplied to the sensor electrodes C1 to C4 through the sensor lines L1 to L4. During a touch sensor driving period Tt, a sensor driving signal Tdrv may be supplied to the sensor electrodes C1 to C4 through the sensor lines L1 to L4.

The length of the sensor lines L1 to L4 may vary depending on where the touch sensors may be located. Accordingly, the delay time of the common voltage Vcom applied to the sensor electrodes C1 to C4 may vary depending on the locations of the touch sensors, due to variations in length between the sensor lines L1 to L4, thus making picture quality nonuniform.

For example, as shown in FIG. 3, the delay time of the common voltage Vcom applied to the first sensor electrode C1 through the first sensor line L1 may be longer than the delay time of the common voltage Vcom applied to the fourth sensor electrode C4 through the fourth sensor line L4. That is, the first sensor line L1 involves a longer RC delay than the fourth sensor line L4 because the first sensor line L1 may be larger in length than the fourth sensor line L4. Hence, even when the same voltage may be applied to the first and fourth sensor lines L1 and L4, the voltage of the first sensor electrode C1 may be lower than the voltage of the fourth sensor electrode C4. Due to RC delay, the delay time of the sensor driving signal Tdrv also may vary depending on the locations of the touch sensors.

For a large-screen display device, the differences in length between the sensor lines L1 to L4 become larger. Accordingly, in-cell touch sensor technology might suffer from non-uniformity in the common voltage Vcom applied through the sensor electrodes C1 to C4 during the display driving period Td. This can result in deterioration of the picture quality of the display device.

Large-screen display devices may have large parasitic capacitance due to coupling between in-cell touch sensors and pixels. This may increase the size and resolution of a touch screen using the in-cell touch sensors and also increase the parasitic capacitance connected to the in-cell touch sensors, leading to a reduction in touch sensitivity and touch recognition accuracy. Therefore, there is a desire to reduce the parasitic capacitance of touch sensors in order to apply the in-cell touch sensor technology to the touch screen of a large-screen display device.

The common voltage Vcom of the pixels may vary depending on the screen position, because of RC delay variations on the display panel. Also, the common voltage Vcom may vary when the display panel is driven in a time-division manner in a display driving period and a touch sensor driving period, separately, or when the display driving period starts immediately after the touch sensor driving period. Because such common voltage variations may cause luminance variations between the pixels, horizontal lines may appear on the screen.

One way to compensate for the variations in common voltage Vcom is to compensate common voltages by sensing common voltage changes fed back from the common electrode of the display panel. An example method of common voltage feedback compensation was proposed by the present applicant in Korean Laid-Open Patent Nos. 10-2006-0077951, filed on Jul. 5, 2006, and 10-2013-0139679, filed on Dec. 23, 2013. Such a method may require a feedback line for connecting the common electrode and a feedback compensation circuit. However, the feedback line cannot be connected to each of the sensor electrodes, which may be divided from the common electrode as shown in FIG. 1, so the method of common voltage compensation may not be applicable.

SUMMARY

Embodiments of the invention provide a touch sensing device which is capable of compensating a common voltage applied to sensor electrodes and a display device using the same.

A touch sensing device according to embodiments of the present invention comprises a feedback voltage transmitter and a common voltage compensator. The feedback voltage transmitter comprises a feedback line, switching elements connecting sensor lines to the feedback line, and a feedback control line controlling the on/off of the switching elements. The common voltage compensator receives feedback voltage supplied to the sensor lines through the feedback line while the sensor lines may be connected to the feedback line, and compensates the feedback voltage to a reference voltage level. A display device according to embodiments of the present invention comprises the feedback voltage transmitter and the common voltage compensator.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain principles of embodiments of the invention. In the drawings.

DETAILED DESCRIPTION OF THE ILLUSTRATED EMBODIMENTS

Figure 1:
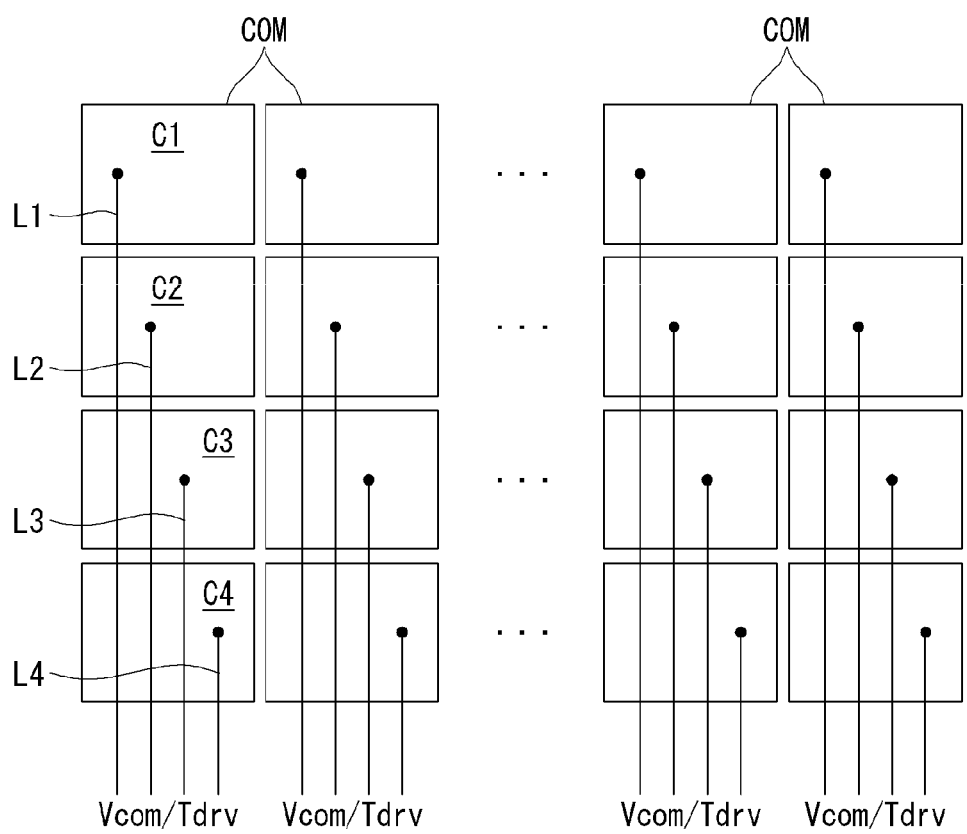
FIG. 1 is a view showing sensor lines connected to touch sensors.

Hereinafter, example embodiments of the present invention will be described in detail with reference to the attached drawings. Throughout the specification, the same or similar reference numerals may indicate substantially the same or similar components. Further, in the following description, well-known functions or constructions related to embodiments of the present invention will not be described in detail if it appears that such description could obscure understanding of the invention.

The display device of embodiments of the invention may be implemented as a flat panel display such as a liquid crystal display (LCD), a field emission display (FED), a plasma display panel (PDP), an organic light emitting display (OLED), or an electrophoresis display (EPD), for example. In the following description, embodiments of the invention will be described focusing on a liquid crystal display, merely as an example of the flat panel display, but embodiments are not limited thereto. For example, any display device may be used as the display device of embodiments of the invention as long as the in-cell touch sensor technology is applicable.

Figure 4:
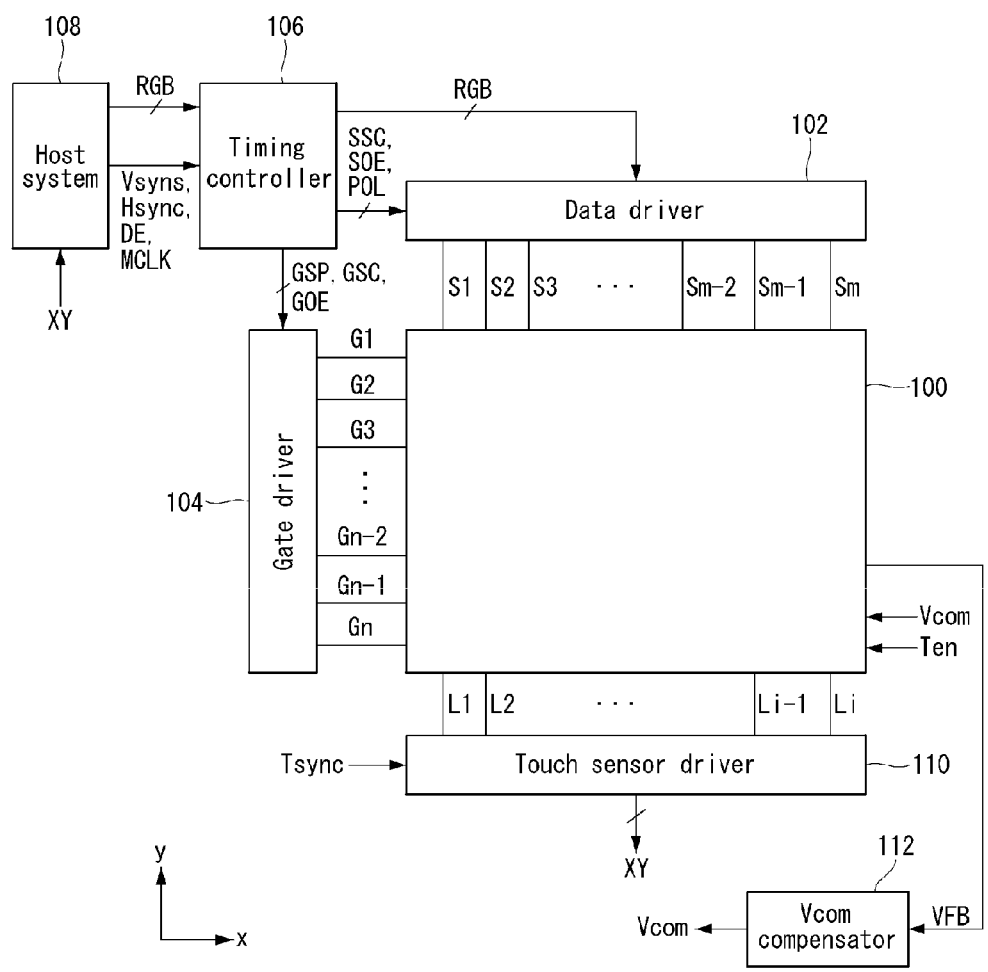
FIG. 4 is a block diagram schematically showing a display device according to an example embodiment of the present invention.
Figure 5:
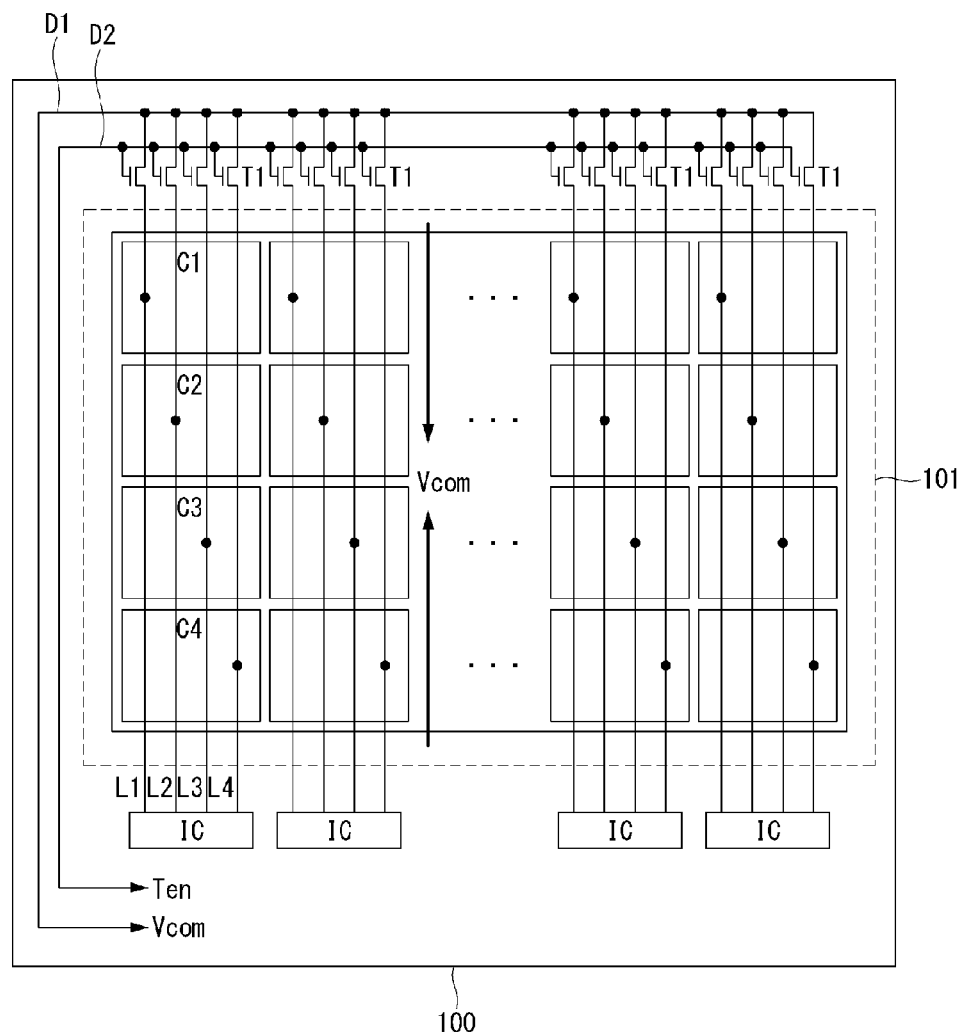
FIG. 5 is a top plan view showing a double feeding unit and sensor electrodes.
Figure 6:
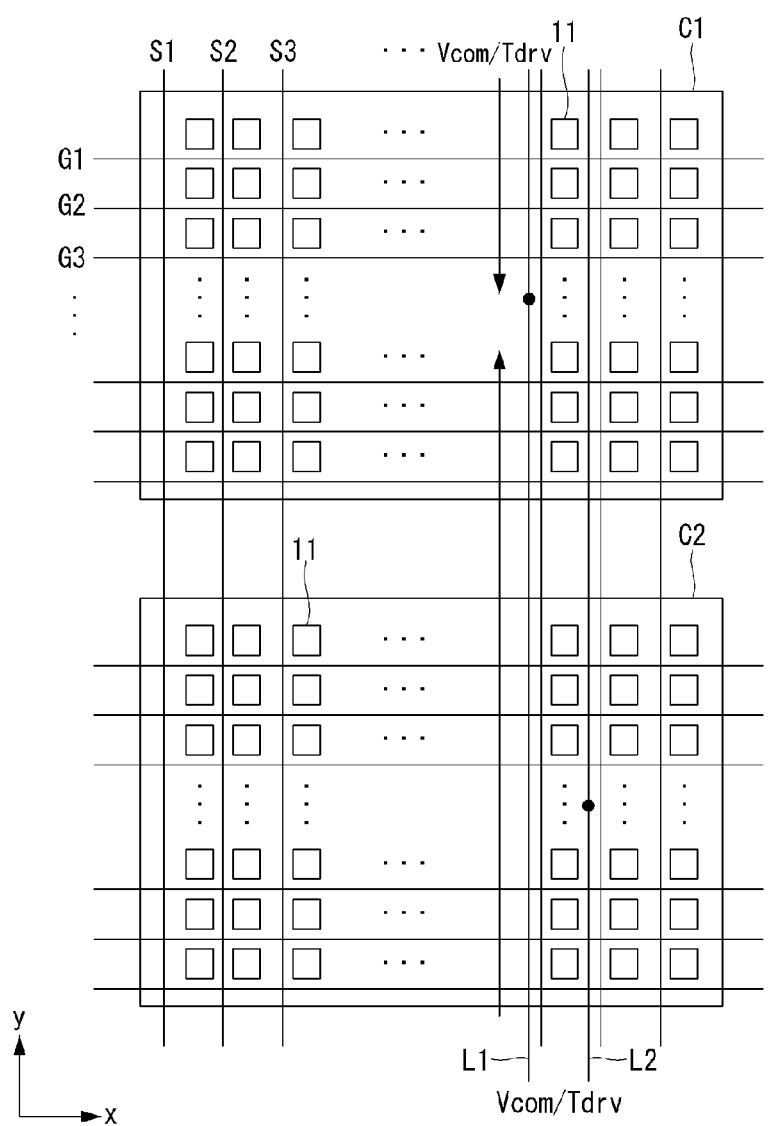
FIG. 6 is an enlarged top plan view of part of the sensor electrodes.

FIGS. 4 to 6 are block diagrams schematically showing a display device of an embodiment of the present invention. In FIG. 6, reference numeral 11 denotes pixel electrodes of pixels, and in FIG. 5, reference numeral 101 denotes a pixel array that displays an input image. A portion outside the pixel array 101 on the display panel 100 may be a non-display and/or bezel area.

With reference to FIGS. 4 to 6, the display device of this embodiment of the invention comprises a touch sensing device. The touch sensing device detects touch input using touch sensors embedded in the display panel 100. The display device may be driven in a time-division manner in a display driving period and a touch sensor driving period, separately. During the display driving period, input image data may be written. During the touch sensor driving period, the touch sensors may be driven to detect touch input.

The touch sensors may be implemented as capacitance-type touch sensors which can be embodied as in-cell touch sensors. FIG. 5 illustrates self-capacitance type touch sensors. A sensor line may be connected to each of the self-capacitance type touch sensors, but the sensor line may not be divided into a Tx line and an Rx line. A sensing circuit supplies an electric charge to the sensor line connected to the touch sensors, and senses the amount of electric charge in the capacitance through the sensor line.

A common electrode that supplies a common voltage Vcom to the pixels may be divided into a plurality of sensor electrodes. Accordingly, the touch sensors may be embedded in a pixel array and connected to the pixels. In the following embodiments, the common voltage may be illustrated as applied to the pixels of the liquid crystal display, but embodiments of the present invention are not limited to this example. For example, the common voltage can be understood as being a voltage commonly supplied to the pixels of a flat panel display, such as high/low potential power voltages VDD/VSS commonly supplied to, for example, the pixels of an organic light emitting diode display.

In the liquid crystal display, a liquid crystal layer may be formed between two substrates on the display panel 100. Liquid crystal molecules of the liquid crystal layer may be driven by an electric field generated by a potential difference between a data voltage applied to the pixel electrodes 11 and the common voltage Vcom applied to the common electrode. The pixel array of the display panel 100 may include pixels defined by data lines S1 to Sm ("m" being a positive integer) and gate lines G1 to Gn ("n" being a positive integer), touch sensors divided from the common electrode connected to the pixels, and switching elements (not shown in FIG. 4) connected to the sensor lines L1 to Li ("i" being a positive integer greater than 0 and less than "m").

The sensor lines L1 to Li may be equal in length within the pixel array (or screen). The common voltage Vcom may be supplied to the sensor electrodes of the touch sensors through both ends of the sensor lines L1 to Li during the display driving period Td.

The sensor lines L1 to Li may be connected on a one-to-one basis to the sensor electrodes C1 to C4 of the touch sensors. For example, the first sensor line L1 may be connected to the first sensor electrode C1, and the second sensor line L2 may be connected to the second sensor electrode C2. The third sensor line L3 may be connected to the third sensor electrode C3, and the fourth sensor line L4 may be connected to the fourth sensor electrode C4. A double feeding unit shown in FIG. 5 may be connected to both ends of the sensor lines L1 to Li.

Each pixel may include pixel TFTs (thin film transistors) formed at crossings between the data lines S1 to Sm and the gate lines G1 to Gn, a pixel electrode that receives a data voltage through the pixel TFTs, a common electrode for applying a common voltage to the pixels, and a storage capacitor Cst that may be connected to the pixel electrode and may hold the voltage of liquid crystal cells. The common electrode may be divided into a plurality of sensor electrodes during the touch sensor driving period.

A black matrix, color filters, etc., may be formed on an upper substrate of the display panel 100. A lower substrate of the display panel 100 may be implemented in a COT (color filter on TFT) structure. In this example, the color filters may be formed on the lower substrate of the display panel 100. Polarizers may be respectively attached to the upper and lower substrates of the display panel, and an alignment layer for setting a pre-tilt angle of liquid crystal may be formed at an inner surface contacting the liquid crystal. A column spacer for maintaining a cell gap may be formed between the upper glass substrate and lower glass substrate of the display panel 100.

A backlight unit may be disposed on the back surface of the display panel 100. The backlight unit may be implemented as an edge type or direct type backlight unit to irradiate light to the display panel 100. The display panel 100 may be implemented in any well-known liquid crystal mode, such as a TN (Twisted Nematic) mode, a VA (Vertical Alignment) mode, an IPS (In-Plane Switching) mode, and an FFS (Fringe Field Switching) mode. A self-emissive display device such as an organic light emitting diode display may not require a backlight unit.

The display device of this invention may further include display drivers 102, 104, and 106 for writing input image data to the pixels, a touch sensor driver 110 for driving the touch sensors, and a Vcom compensator 112.

Figure 2:
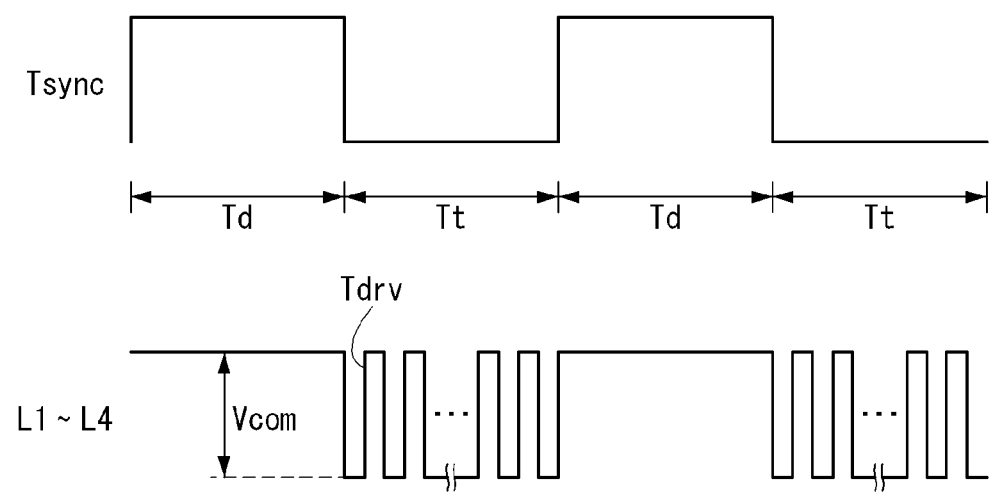
FIG. 2 is a waveform diagram showing a common voltage and a touch driving signal which may be applied to touch sensors according to the in-cell touch sensor technology.
Figure 3:
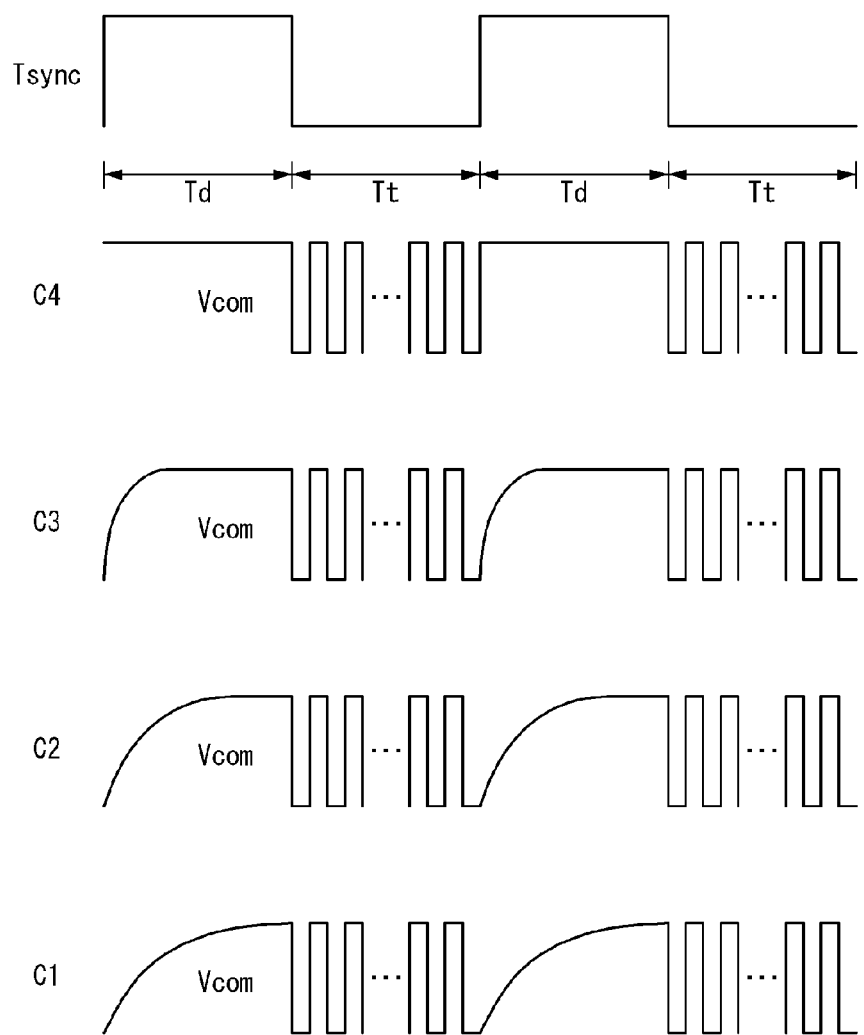
FIG. 3 is a waveform diagram showing a common voltage which may vary in delay time depending on the locations of the touch sensors according to the in-cell touch sensor technology.

As shown in FIG. 2, one frame period may be time-divided into a display driving period Td and a touch sensor driving period Tt. The display drivers 102, 104, and 106 and the touch sensor driver 110 may be synchronized with each other in response to a synchronization signal Tsync.

The display drivers 102, 104, 106 may write data to the pixels during the display driving period Td (see FIG. 2). As the pixel TFTs may be in the off state during the touch sensor driving period Tt (see FIG. 2), the pixels hold the data voltage stored in them from during the display driving period Td. During the touch sensor driving period Tt, the display drivers 102, 104, and 106 may feed, to the signal lines S1 to Sm and G1 to Gm, an alternating current signal having the same phase as a touch driving signal Tdrv applied to the touch sensors through the sensor lines L1 to Li, in order to reduce parasitic capacitance between the signal lines S1 to Sm and G1 to Gn connected to the touch sensors and the pixels. The signal lines connected to the pixels may be signal lines for writing data to the pixels, and may include the data lines S1 to Sm for supplying a data voltage to the pixels and the gate lines G1 to Gm for supplying a gate pulse (or scan pulse) to select pixels to which data may be written. The display drivers 102, 104, and 106 may include a data driver 102, a gate driver 104, and a timing controller 106.

The data driver 102 may convert digital video data, e.g., RGB data, of an input image received from the timing controller 106, into an analog positive/negative gamma compensation voltage during the display driving period Td to output a data voltage. The data voltage output from the data driver 102 may be supplied to the data lines S1 to Sm.

During the touch sensor driving period Tt, the data driver 102 may apply an alternating current signal having the same phase as the touch driving signal Tdrv applied to the touch sensors to the data lines S1 to Sm in order to reduce the effects of parasitic capacitance between the touch sensors and the data lines. This reduction occurs because the voltages at both ends of the parasitic capacitance may change simultaneously, and the smaller the voltage difference, the smaller the amount of electric charge stored in the parasitic capacitance. As one end of the touch sensors may be connected to the sensor electrodes, and the other end of the touch sensors may be connected to the ground GND, the touch sensors store an electric charge upon application of the touch driving signal Tdrv.

The gate driver 104 may sequentially supply a gate pulse (or scan pulse) synchronized with the data voltage to the gate lines G1 to Gn during the display driving period Td to select lines of the display panel 100 to which the data voltage may be written. The gate pulse may swing between a gate high voltage VGH and a gate low voltage VGL. The gate pulse may be applied to the gates of the pixel TFTs through the gate lines G1 to Gn. The gate high voltage VGH may be set to a voltage higher than a threshold voltage of the pixel TFTs to turn on the pixel TFTs. The gate low voltage VGL may be lower than the threshold voltage of the pixel TFTs.

The gate driver 104 may apply the alternating current signal having the same phase as the touch driving signal Tdrv to the gate lines G1 to Gn during the touch sensor driving period Tt, to reduce parasitic capacitance between the touch sensors and the data lines. The voltage of the alternating current signal applied to the gate lines G1 to Gm during the touch sensor driving period Tt may be lower than the gate high voltage VGH and the threshold voltage of the pixel TFTs to prevent changes to the data written to the pixels.

The timing controller 106 may receive timing signals, such as a vertical synchronization signal Vsync, a horizontal synchronization signal Hsync, a data enable signal DE, and a main clock MCLK, from a host system 108, to synchronize the operation timings of the data driver 102 and gate driver 104. The scan timing control signal may include a gate start pulse GSP, a gate shift clock, a gate output enable signal GOE, etc. The data timing control signal may include a source sampling clock SSC, a polarity control signal POL, a source output enable signal SOE, etc.

The host system 108 may be implemented as, for example, a television system, a set-top box, a navigation system, a DVD player, a Blu-ray player, a personal computer (PC), a home theater system, or a phone system. The host system 108 may include a system on chip (SoC), in which a scaler may be embedded, and thus converts the digital video data RGB of the input image into a data format suitable for the resolution of the display panel 100. The host system 108 may transmit the digital video data RGB and the timing signals Vsync, Hsync, DE, and MCLK to the timing controller 106. Further, the host system 108 may run an application associated with the coordinates (X,Y) of touch input received from the touch sensor driver 110. The timing controller 106 or host system 108 may generate a synchronization signal Tsync for synchronizing the display drivers 102, 104, and 106 and the touch sensor driver 110.

The touch sensor driver 110 may generate a voltage for the touch driving signal Tdrv supplied to the sensor electrodes C1 to C4 during the touch sensor driving period Tt. Capacitance may increase when a finger touches a self-capacitance type touch sensor. The touch sensor driver 110 may detect a touch position and a touch area by measuring a change in capacitance (or electric charge) caused by an object touching the self-capacitance type touch sensor to which the touch driving signal may be applied. The touch sensor driver 110 may calculate the coordinates (X,Y) of touch input and transmit them to the host system 108.

As shown in FIG. 5, the data driving circuit 12 and the touch sensor driver 110 may be integrated in one IC (integrated circuit) and bonded onto a substrate of the display panel by a COG (chip on glass) process. Also, the Vcom compensator 12 may be embedded in the IC, along with the data driving circuit 12 and the touch sensor driver 110.

The Vcom compensator 112 may receive a feedback voltage on the sensor electrodes during the display driving period by using the double feeding unit shown in FIG. 5. The Vcom compensator 112 may compensate the common voltage to the predetermined reference voltage level based on the feedback voltage, and supply the feedback-compensated common voltage Vcom to the sensor electrodes through the double feeding unit.

The double feeding unit may supply the common voltage Vcom to the pixels through the sensor electrodes C1 to C4 short-circuited to each other during the display driving period Td. The double feeding unit may apply the common voltage to both ends of the sensor lines L1 to L4 to reduce delay in the common voltage Vcom applied to the sensor electrodes C1 to C4 and make the common voltage of the pixels uniform throughout the screen. The double feeding unit may turn off the switching elements during the touch sensor driving period Tt to electrically separate the sensor electrodes C1 to C4.

The double feeding unit may include a first feeder that applies the common voltage Vcom to one end of the sensor lines L1 to L4 during the display driving period Td, and a second feeder that interconnects the sensor lines L1 to L4 via a feedback line D1 during the display driving period Td and supplies the common voltage Vcom to the other end of the sensor lines L1 to L4. The touch sensors may be short-circuited to each other because they are connected to the sensor lines L1 to L4 through the feedback line D1 during the display driving period Td.

The first feeder may supply a touch driving signal to the touch sensors through the sensor lines L1 to L4 during the touch sensor driving period Tt. The second feeder may separate the sensor lines during the touch sensor driving period Tt to drive the touch sensors independently.

The first feeder and the second feeder may be located opposite to each other, with the sensor lines L1 to L4 interposed between them. As shown in FIG. 5, the first feeder may be an IC connected to the lower ends of the sensor lines L1 to L4, and the second feeder may be connected to the upper ends of the sensor lines L1 to L4, but embodiments of the present invention are not limited to this example. If the sensor lines L1 to L4 are formed along a horizontal direction, for example, the first feeder and second feeder may be respectively disposed on the left and right sides of the display panel 100, with the sensor lines L1 to L4 interposed between them.

The second feeder may include TFTs T1 connected to the sensor lines L1 to L4, a feedback line D1 connected to the TFT T1, and a feedback control line D2. An enable signal Ten for turning on/off the TFTs of the second feeder may be generated from the timing controller 106 or touch sensor driver 110. The enable signal Ten may be supplied to the feedback control line D2. The second feeder may operate as a feedback voltage transmitter that sends feedback to the Vcom compensator 112 on the common voltage supplied to the sensor electrodes C1 to C4 through the sensor lines L1 to L4.

The TFTs T1 may be switching elements which are formed simultaneously with the pixel TFTs and have the same structure and size as the pixel TFTs. Each TFT T1 may have a gate connected to the feedback control line D2, a drain connected to the feedback line D1, and a source connected to a sensor line. The TFTs T1 supply the common voltage Vcom from the feedback line D1 to the sensor lines L1 to L4 in response to an enable signal Ten having the gate high voltage VGH applied through the feedback control line D2 during the display driving period Td. Accordingly, the TFTs T1 selectively connect the feedback line D1 and the sensor lines L1 to L4 in response to the voltage through the feedback control line D2.

The feedback line D1 and the feedback control line D2 may be low-resistance metal lines which may be formed along the bezel area outside the pixel array 102. The TFTs T1 may be in the off state during the touch sensor driving period Tt. An alternating current signal having the same phase as the touch driving signal Tdrv may be applied to the gate and drain of the TFTs T1 in order to reduce parasitic capacitance between the TFTs and the sensor lines L1 to L4 during the touch sensor driving period Tt.

FIG. 6 is an enlarged top plan view of part of the sensor electrodes. As shown in FIG. 6, the sensor electrodes C1 to C4 may be patterned to be larger in size than the pixels and respectively connected to a plurality of pixels. The sensor electrodes C1 to C4 may be made of transparent conductive material, for example, ITO (indium tin oxide). The sensor lines L1 to L4 may be made of low-resistance metal, for example, Cu, AlNd, Mo, or Ti. The sensor electrodes C1 to C4 may be common electrodes which may be connected to one another and feed the common voltage Vcom to the pixels during the display driving period Td. The sensor electrodes C1 to C4 may be separated (e.g., electrically isolated) from each other during the touch sensor driving period Tt. Accordingly, the touch sensors may be separated from each other and driven individually during the touch sensor driving period Tt.

Figure 7:
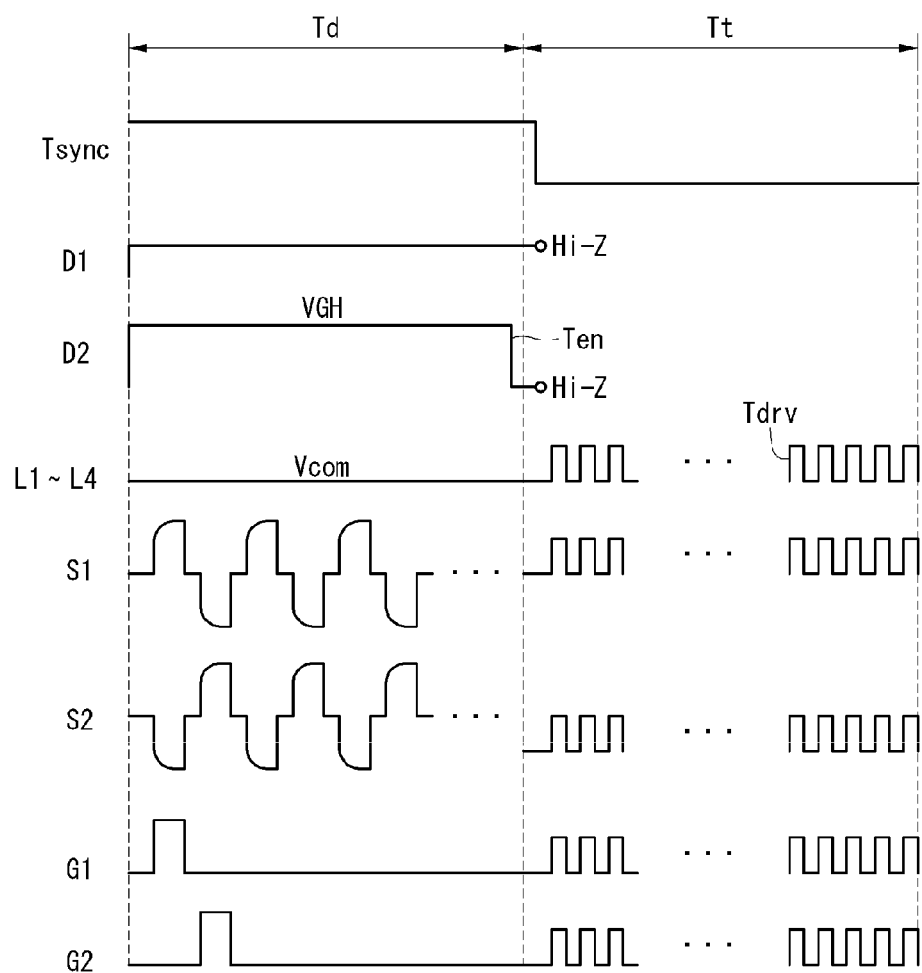
FIGS. 7 to 9 are waveform diagrams showing a pixel driving signal and touch driving signal which may be applied to the display device according to embodiments of the present invention.
Figure 8:
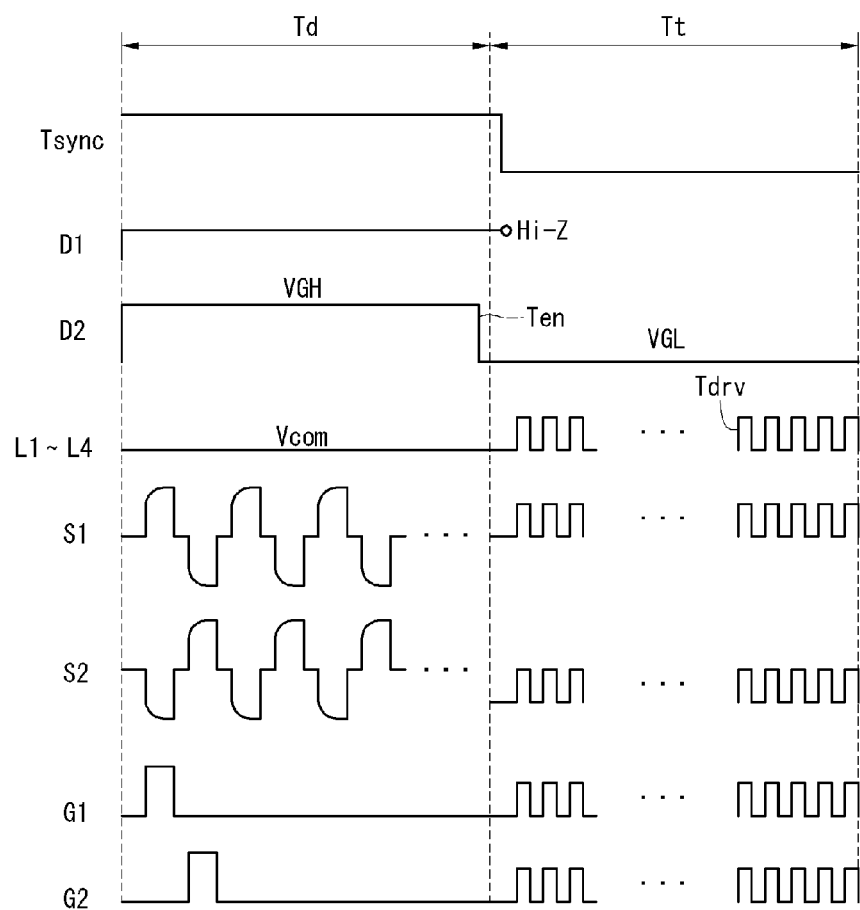
Figure 9:
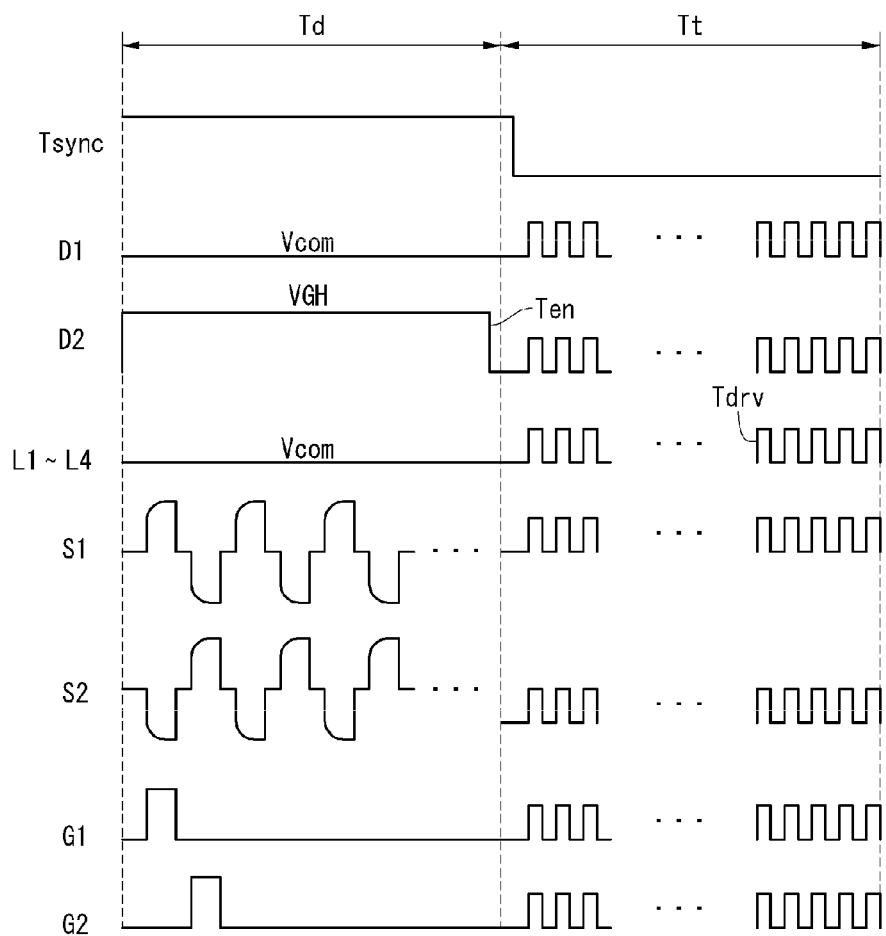

FIGS. 7 to 9 are waveform diagrams showing a pixel driving signal and touch driving signal applied to the display device. With reference to FIG. 7, input image data may be written to the pixels during the display driving period Td. During the display driving period Td, a data voltage of the input image may be supplied to the data lines S1 and S2, a gate pulse synchronized with the data voltage may be sequentially applied to the scan lines G1 and G2. The common voltage Vcom may be supplied to the sensor electrodes C1 to C4 connected to one another through both ends of the sensor lines L1 to L4 during the display driving period Td. During the display driving period Td, the gate high voltage VGH higher than the threshold voltage of the TFTs T1 may be supplied to the feedback control line D2, and the common voltage Vcom may be supplied to the feedback line D1. Accordingly, the common voltage Vcom may be supplied to both ends of the sensor lines L1 to L4 through the ICs and the TFTs T1. When the common voltage Vcom is applied to the sensor electrodes C1 to C4 through both ends of the sensor lines L1 to L4, a voltage drop across the sensor electrodes C1 to C4 may be prevented, thus making the common voltage Vcom applied to the pixels on a large screen uniform and improving picture quality.

The data voltage stored in the pixels may be maintained during the touch sensor driving period Tt because the pixel TFTs and the TFTs T1 of the second feeder may be in the off state during the touch sensor driving period Tt.

The feedback line D1 and the feedback control line D2 may be kept at high impedance (Hi-Z), where no voltage may be applied, during the touch sensor driving period Tt. The TFTs T1 may be maintained in the off state during the touch sensor driving period Tt because the feedback line D1 and the feedback control line D2 may be kept at high impedance.

The display drivers 102, 104, and 106 may generate an alternating current signal having the same phase as the touch driving signal Tdrv and supply it to the signal lines S1, S2, G1, and G2 during the touch sensor driving period Tt, in order to reduce parasitic capacitance between the sensor lines L1 to L4 and the signal lines S1, S2, G1, and G2 connected to the pixels. To reduce parasitic capacitance, the voltage of the alternating current signal may be set to be the same as that of the touch driving signal Tdrv.

With reference to FIG. 8, the pixel driving method and touch sensor driving method to be performed during the display driving period Td may be substantially the same as those of the example embodiment of FIG. 7, so a detailed description of these methods will be omitted.

As shown in FIG. 8, the data voltage stored in the pixels may be maintained during the touch sensor driving period Tt because the pixel TFTs and the TFTs T1 of the second feeder may be in the off state during the touch sensor driving period Tt. The feedback line D1 may be kept at high impedance during the touch sensor driving period Tt. The feedback control line D2 may be maintained at the gate low voltage VGL lower than the threshold voltage of the TFTs T1.

The touch sensor driver 110 may generate a voltage for the touch driving signal Tdrv supplied to the sensor electrodes C1 to C4 during the touch sensor driving period Tt. The data drivers 102, 104, and 106 generate an alternating current signal having the same phase as the touch driving signal Tdrv during the touch sensor driving period Tt, in order to reduce parasitic capacitance between the sensor lines L1 to L4 and the signal lines S1, S2, G1, and G2 connected to the pixels.

With reference to FIG. 9, the pixel driving method and touch sensor driving method to be performed during the display driving period Td may be substantially the same as those of the example embodiment of FIG. 7, so a detailed description of these methods will be omitted.

As shown in FIG. 9, the data voltage stored in the pixels may be maintained during the touch sensor driving period Tt, because the pixel TFTs and the TFTs T1 of the second feeder may be in the off state during the touch sensor driving period Tt. The voltage of the alternating current signal applied to pixel signal lines S1 and S2 and G1 and G2 and the sensor lines L1 to L4 and the voltage of the touch driving signal Tdrv may be lower than the gate high voltage VGH and the threshold voltage of the pixel TFTs, so as to prevent changes to the data written to the pixels.

The touch sensor driver 110 may generate a voltage for the touch driving signal Tdrv supplied to the sensor electrodes C1 to C4 during the touch sensor driving period Tt. The data drivers 102, 104, and 106 may generate an alternating current signal having the same phase as the touch driving signal Tdrv during the touch sensor driving period Tt, in order to reduce parasitic capacitance between the sensor lines L1 to L4 and the signal lines S1, S2, G1, and G2 connected to the pixels, the parasitic capacitance between the sensor lines L1 to L4 and the feedback line D1, and the parasitic capacitance between the sensor lines L1 to L4 and the feedback control line D2. This alternating current signal may be supplied to the sensor lines L1 to L4, the signal line S1, S2, G1, and G2 connected to the pixels, the feedback line D1, and the feedback control line D2 during the touch sensor driving period Tt. The touch driving signal Tdrv and the alternating current signal generated with the same phase as the touch driving signal Tdrv may have a lower voltage than the threshold voltage of the TFTs T1. Accordingly, the TFTs T1 may be in the off state during the touch sensor driving period Tt.

Figure 10:
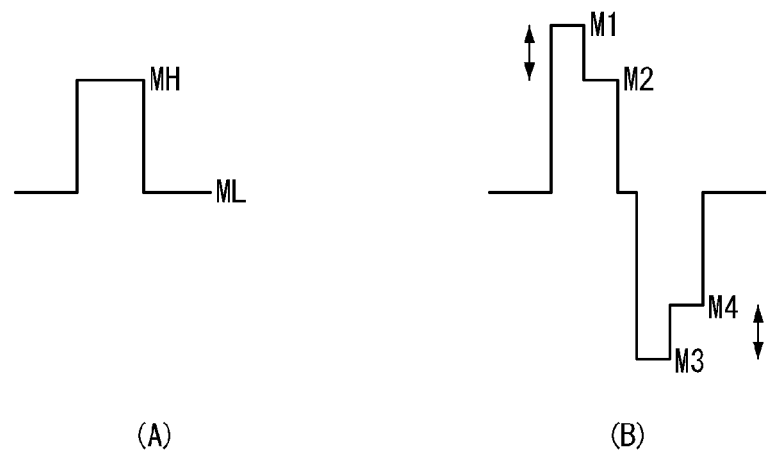
FIG. 10 is a waveform diagram showing various examples of the touch driving signal.

FIG. 10 is a waveform diagram showing various examples of the touch driving signal Tdrv. The touch driving signal Tdrv may have different waveforms and voltages by taking into account the size, resolution, RC delay, etc. of the display panel. For example, if the RC delay is long, the touch driving signal Tdrv may be set to a high voltage, taking voltage drop into account. The touch driving signal Tdrv may have a voltage which swings between a high-potential voltage MH and a low-potential voltage ML. Also, the touch driving signal Tdrv may have a multi-step waveform that changes between M1 to M4 (M1>M2>M4>M3). M1 may be the potential for providing an electric charge to the touch sensors within a short time, and M3 may be the potential for quickly draining residual electric charge in the touch sensors. In an example, the touch driving signal Tdrv shown in example (B) of FIG. 10 may have a multi-step waveform as described in U.S. patent application Ser. No. 14/079,798, filed on Nov. 14, 2013. The alternating current signal having the same phase as the touch driving signal Tdrv may have different waveforms, as shown in FIG. 10.

Figure 11:
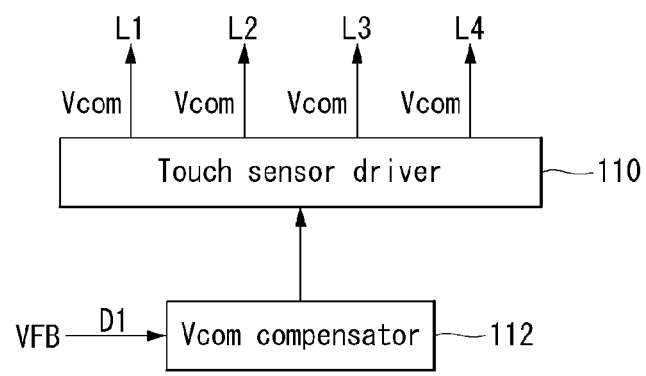
FIG. 11 is a view showing an example where a common voltage is supplied to each of the sensor electrodes.
Figure 12:
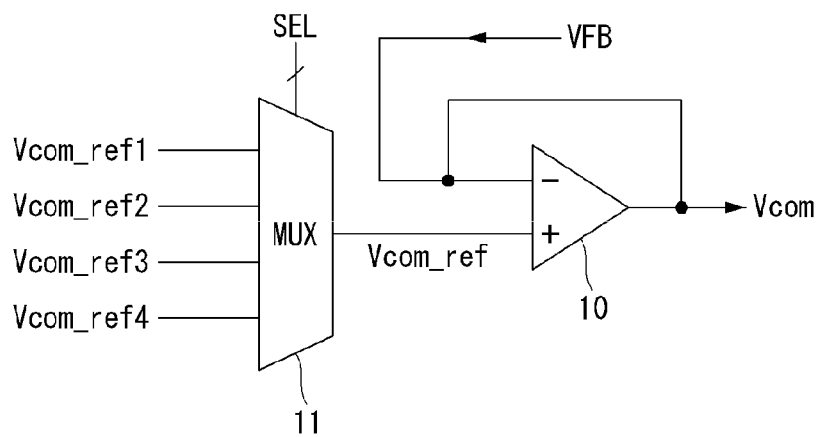
FIG. 12 is a view showing an example of reference voltage of a Vcom compensator.

FIG. 11 is a view showing an example where a common voltage Vcom may be supplied to each of the sensor electrodes C1 to C4. FIG. 12 is a view showing reference voltage variations of a Vcom compensator.

With reference to FIGS. 11 and 12, a feedback input terminal of the Vcom compensator 112 may be connected to the feedback line D1. The Vcom compensator 112 may receive feedback about a common voltage Vcom from the feedback line D1. The Vcom compensator 112 may receive feedback voltage through the feedback line D1 connected to the sensor lines L1 to L4, and output a feedback-compensated common voltage Vcom compensated as much as difference between the feedback voltage VFB and the reference voltage. The touch sensor driver 110 may supply the feedback-compensated common voltage Vcom to each of the sensor electrodes C1 to C4 through the sensor lines L1 to L4.

The Vcom compensator 112 may be implemented as an inverting amplifier 10, as shown in FIG. 12. The inverting amplifier 10 may include an inverting input terminal (−) connected to the feedback line D1, a non-inverting input terminal (+) to which a reference voltage Vcom_Ref may be input, and an output terminal that outputs the feedback-compensated common voltage Vcom. The inverting amplifier 10 may invert and amplify the difference between the feedback voltage VFB and the reference voltage Vcom_ref so that the common voltage Vcom to be supplied to the sensor electrodes C1 to C4 may be maintained at the voltage level of the reference voltage Vcom_ref.

The touch sensor driver 110 may supply the feedback-compensated common voltage Vcom to both ends of the sensor lines L1 to L4 through the first and second feeders. The touch sensor driver 110 may vary the voltage level of the common voltage Vcom applied to the sensor lines L1 to L4 by taking into account RC delay variations depending on the locations of the sensor electrodes C1 to C4. For example, the common voltage Vcom applied to the second sensor line L2 may be higher than the common voltage Vcom applied to the first sensor line L1, because the RC delay at the second sensor electrode C2 may be longer than that at the first sensor electrode C1.

The common voltage Vcom may be optimized differently according to the characteristics and driving method of the display panel. To this end, the Vcom compensator 12 may further comprise a multiplexer MUX 11. The multiplexer 11 selects one of several reference voltages Vcom_ref1 to Vcom_ref4 in response to a selection signal SEL and forwards it to the non-inverting terminal (+) of the inverting amplifier 10. The selection signal SEL may be fixed to a specific logic value selected by the characteristics and driving method of the display panel, or may be actively selected by the timing controller 106. It should be appreciated that the four-selection example is non-limiting.

Figure 13:
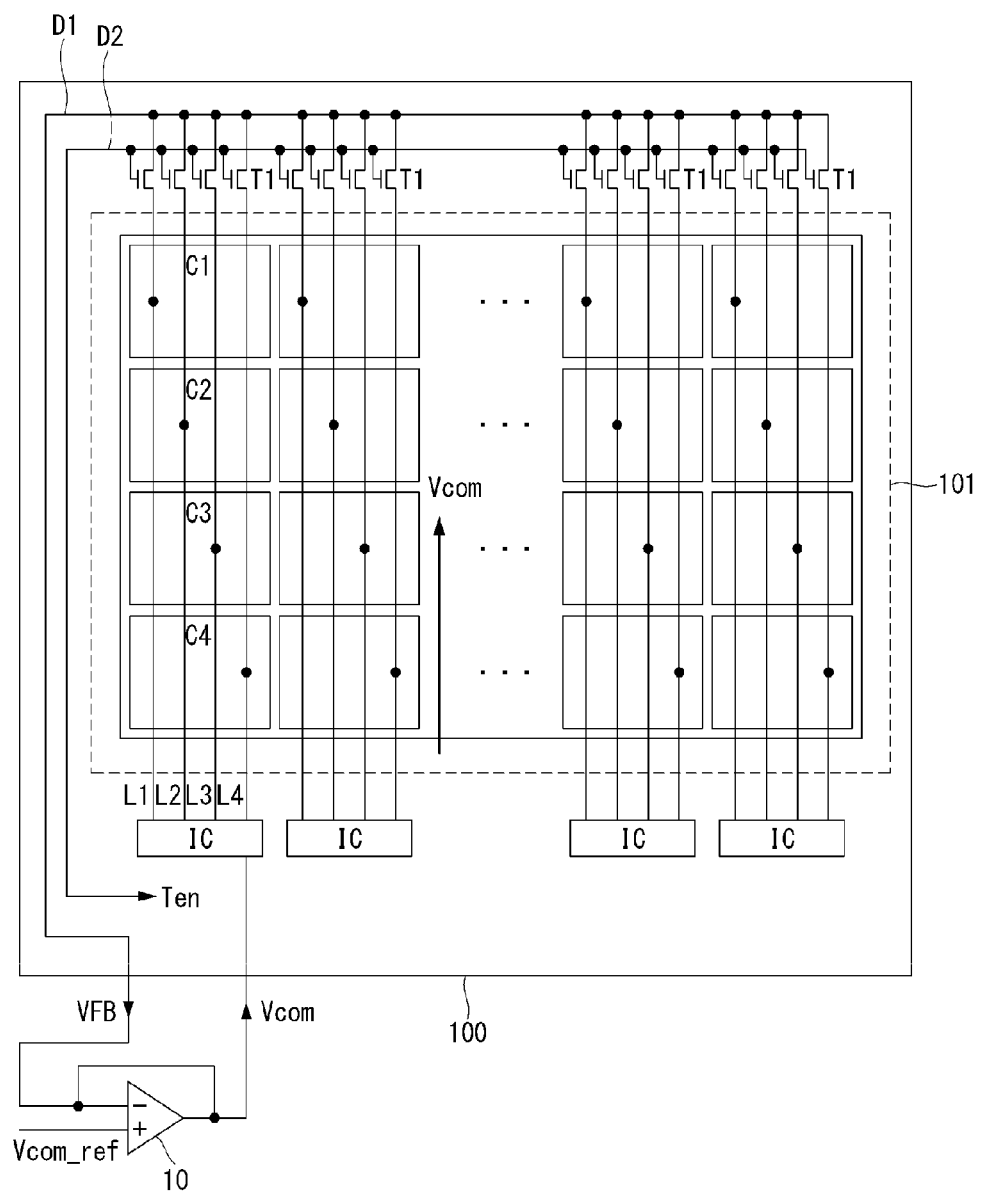
FIG. 13 is a view showing a Vcom compensator according to a first example embodiment of the present invention.

FIG. 13 is a view showing a Vcom compensator according to a first example embodiment of the present invention.

With reference to FIG. 13, the switches T1 may be all turned on in response to an enable signal Ten during the display driving period Td and connect all the sensor lines L1 to L4 to the feedback line D1. The inverting amplifier 10 may receive common voltage feedback from the sensor electrodes C1 to C4 through the feedback line D1 during the display driving period Td. The inverting amplifier 10 may invert and amplify the difference between the feedback voltage VFB and the reference voltage Vcom_ref during the display driving period Td. The touch sensor driver 110 may supply the feedback-compensation common voltage Vcom to the sensor electrodes C1 to C4 through the sensor lines L1 to L4. The reference voltage Vcom_ref of the inverting amplifier 10 may be selected from several voltages with different voltage levels, as shown in FIG. 12. In this example embodiment, the second feeder does not supply the common voltage Vcom to the feedback line D1, but instead uses the feedback line D1 as a transmission path of the feedback voltage VFB.

Figure 14:
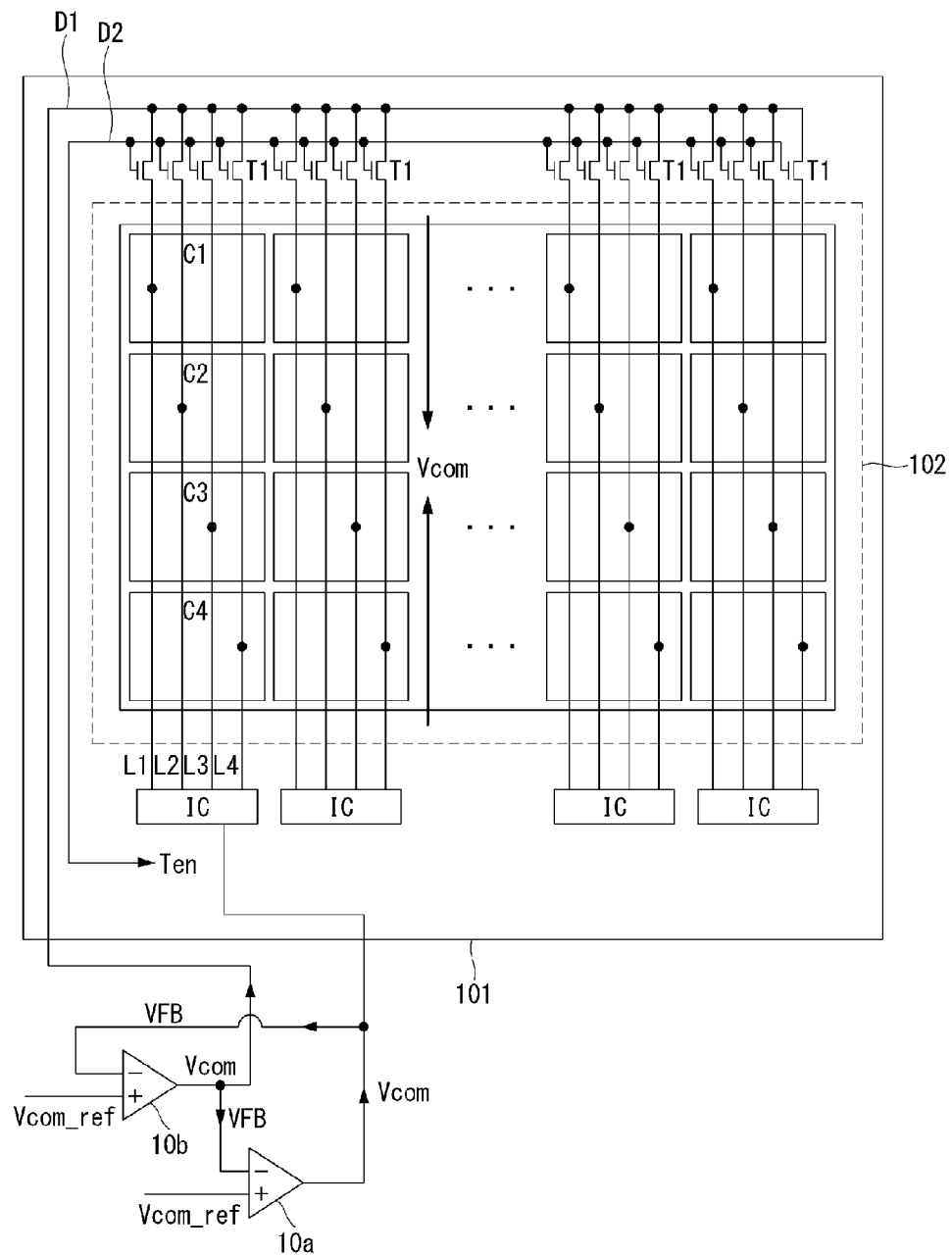
FIG. 14 is a view showing a Vcom compensator according to a second example embodiment of the present invention.

FIG. 14 is a view showing a Vcom compensator according to a second example embodiment of the present invention.

With reference to FIG. 14, the Vcom compensator 112 may include first and second inverting amplifiers 10a and 10b. The switches T1 may be all turned on in response to an enable signal Ten during the display driving period Td and connect all the sensor lines L1 to L4 to the feedback line D1.

The first inverting amplifier 10a may receive the feedback voltage VFB through the feedback line D1 and may supply the feedback-compensated common voltage Vcom to the sensor lines L1 to L4 during the display driving period Td. On the other hand, the second inverting amplifier 10b may receive the feedback voltage VFB through the sensor lines L1 to L4 and may supply the feedback-compensated common voltage Vcom to the feedback line D1 during the display driving period Td. The reference voltage Vcom_ref of the first and second inverting terminals 10a and 10b may be selected from several voltages with different voltage levels, as shown in FIG. 12. In this example embodiment, the second feeder supplies the feedback voltage VFB to the first inverting amplifier 10a, and at the same time supplies the common voltage Vcom feedback-compensated by the second inverting terminal 10b to the sensor lines L1 to L4.

Figure 15:
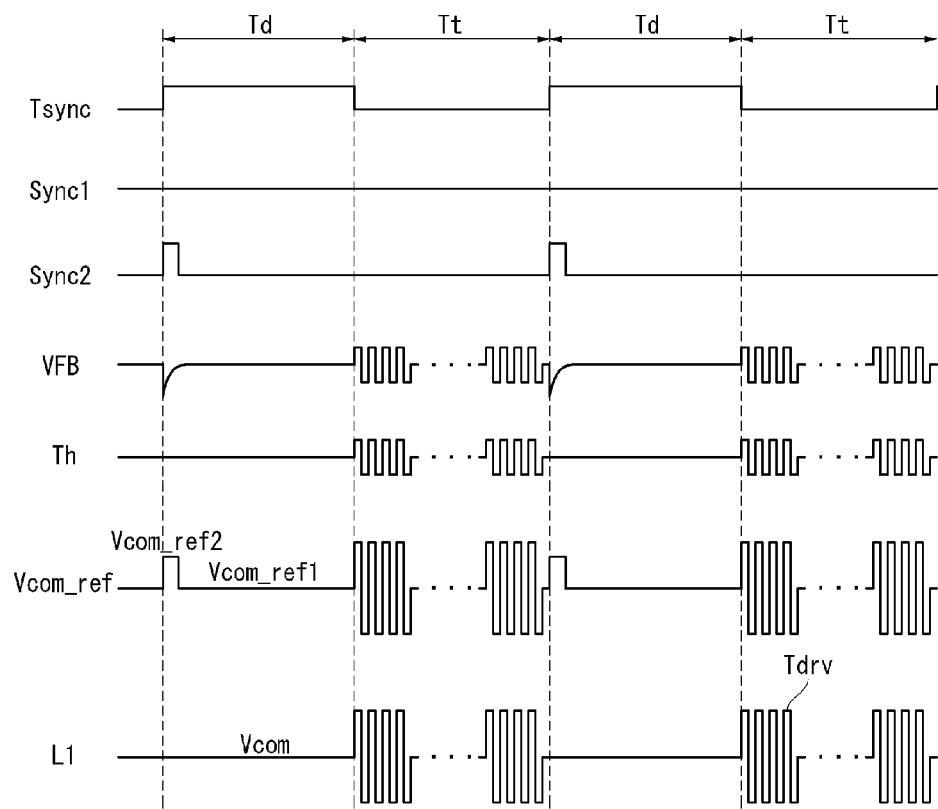
FIGS. 15 and 16 are views showing a method of common voltage feedback compensation according to another example embodiment of the present invention.
Figure 16:
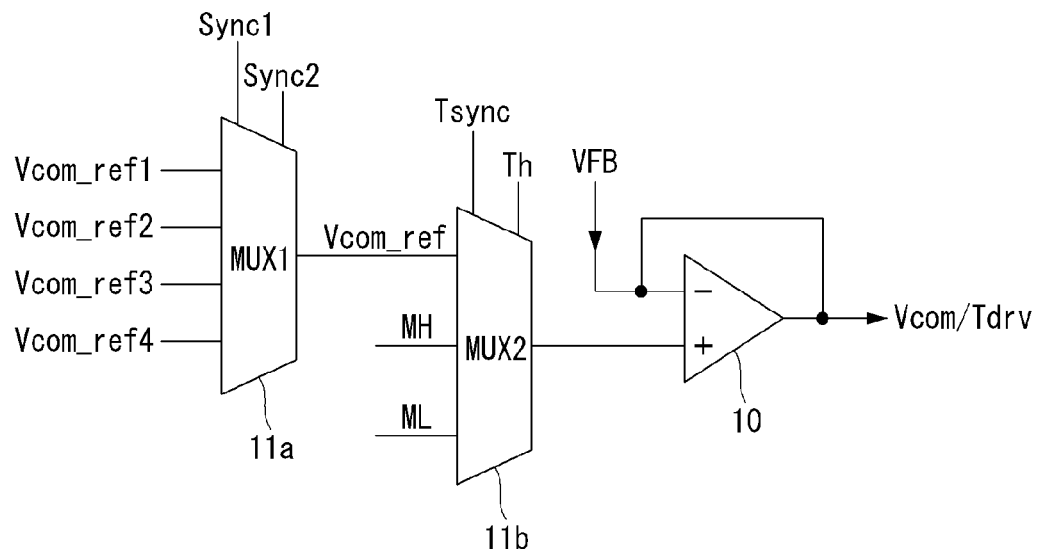

FIGS. 15 and 16 are views showing a method of common voltage feedback compensation according to another example embodiment of the present invention.

With reference to FIGS. 15 and 16, the voltage applied to the sensor electrodes C1 to C4 may be different in the display driving period Td and the touch sensor driving period Tt. Accordingly, the common voltage applied to the sensor electrodes C1 to C4 may drop abruptly at the initial stage of the display driving period Td.

The Vcom compensator 112 may raise the reference voltage to Vcom_ref2 at the initial stage of the display driving period Td for over-driving the common voltage Vcom, and then lower the reference voltage to Vcom_ref1, in order to compensate for a rapid drop in voltage at the initial stage of the display driving period Td. The over-driving period may be set to be equal to or less than one horizontal period at the initial stage of the display driving period Td.

The Vcom compensator 112 may compensate for feedback on the common voltage Vcom and the touch driving signal Tdrv. The Vcom compensator 112 may include a first multiplexer MUX1 11a, a second multiplexer MUX2 11b, and an inverting amplifier 10. The first multiplexer 11a may vary the reference voltage Vcom_ref by selecting a different voltage level according to a first selection signal Sync1 or Sync2.

The second multiplexer 11b may select either the reference voltage Vcom_ref from the first multiplexer 11a, or the alternating current voltage MH or ML of the touch driving signal Tdrv, in response to a second selection signal Tsync or Th. The second selection signal Tsync or Th may allow dividing time into the display driving period Td and the touch sensor driving period Tt. Also, the common voltage Vcom and the touch driving signal Tdrv may be selected according to the selected driving period. The first and second selection signals Sync1 or Sync2, and Tsync or Th, respectively, may be generated by, for example, the timing controller 106.

As stated above, embodiments of the present invention may allow compensating for feedback on the common voltage supplied to the sensor electrodes by connecting the sensor lines to the feedback line and receiving feedback on the common voltage supplied to the sensor lines.

Moreover, embodiments of the present invention may make the common voltage applied to the pixels uniform, and allow the touch sensors to be individually driven by supplying the common voltage to both ends of the sensor lines while the sensor electrodes are connected to the feedback line and separating the sensor lines from each other during the touch sensor driving period.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

What is claimed is:
1. A touch sensing device, comprising:
a common electrode divided into a plurality of sensor electrodes;
a plurality of sensor lines respectively connected to the plurality of sensor electrodes;
a feedback voltage transmitter including:
  a feedback line;
  a plurality of switching elements configured to selectively connect the sensor lines to the feedback line so that a common voltage of the sensor lines is applied to the feedback line; and
  a feedback control line configured to control selection of the switching elements; and
a common voltage compensator configured to:

receive a feedback voltage through the feedback line while the sensor lines are connected to the feedback line through the plurality of switching elements; and compensate the feedback voltage to a reference voltage level, wherein the common voltage is a voltage commonly supplied to the common electrode through the sensor lines during a display driving period for displaying input image data;

wherein the sensor lines are equal in length; and wherein the sensing device is configured to apply the common voltage to both ends of the sensor lines.

2. The touch sensing device of claim 1, wherein the common voltage compensator comprises an inverting amplifier, the inverting amplifier comprising an inverting input terminal connected to the feedback line and a non-inverting input terminal to which a reference voltage is input, and an output terminal configured to output a feedback-compensated common voltage.

3. The touch sensing device of claim 1, wherein:

the common voltage compensator comprises a first inverting amplifier and a second inverting amplifier;

the first inverting amplifier comprises an inverting input terminal connected to the feedback line and a non-inverting input terminal to which a reference voltage is input, and is configured to supply a feedback-compensated common voltage to the sensor lines; and the second inverting amplifier comprises an inverting input terminal connected to the sensor lines and a non-inverting input terminal to which the reference voltage is input, and is configured to supply the feedback-compensated common voltage to the feedback line.

4. The sensing device of claim 2, wherein the common voltage compensator comprises a multiplexer configured to vary the voltage level of the reference voltage in response to a selection signal.

5. The sensing device of claim 2, wherein the common voltage compensator further comprises:

a first multiplexer configured to vary the voltage level of the reference voltage in response to a first selection signal; and a second multiplexer configured to select either the output voltage of the first multiplexer or the voltage of the touch driving signal in response to a second selection signal.

6. The sensing device of claim 3, wherein the common voltage compensator comprises a multiplexer configured to vary the voltage level of the reference voltage in response to a selection signal.

7. The sensing device of claim 3, wherein the common voltage compensator comprises:

a first multiplexer configured to vary the voltage level of the reference voltage in response to a first selection signal; and a second multiplexer configured to select either the output voltage of the first multiplexer or the voltage of the touch driving signal in response to a second selection signal.

8. A display device, comprising:

a display panel including:

a common electrode divided into a plurality of sensor electrodes;

a feedback line;

a plurality of sensor lines respectively to the plurality of sensor electrodes;

a plurality of switching elements configured to selectively connect the sensor lines to the feedback line so that a common voltage of the sensor lines is applied to the feedback line;

a feedback control line configured to control selection of the switching elements; and a common voltage compensator configured to:

receive a feedback voltage through the feedback line while the sensor lines are connected to the feedback line through the plurality of switching elements; and compensate the feedback voltage to a reference voltage level, wherein the common voltage is a voltage commonly supplied to the common electrode through the sensor lines during a display driving period for displaying input image data;

wherein the sensor lines are equal in length; and wherein the display device is configured to apply the common voltage to both ends of the sensor lines.

9. The display device of claim 8, wherein the common voltage compensator comprises an inverting amplifier, the inverting amplifier comprising an inverting input terminal connected to the feedback line and a non-inverting input terminal to which a reference voltage is input, and an output terminal configured to output a feedback-compensated common voltage.

10. The display device of claim 8, wherein:

the common voltage compensator comprises a first inverting amplifier and a second inverting amplifier;

the first inverting amplifier comprises an inverting input terminal connected to the feedback line and a non-inverting input terminal to which a reference voltage is input, and is configured to supply a feedback-compensated common voltage to the sensor lines; and the second inverting amplifier comprises an inverting input terminal connected to the sensor lines and a non-inverting input terminal to which the reference voltage is input, and is configured to supply the feedback-compensated common voltage to the feedback line.

11. The display device of claim 9, wherein the common voltage compensator comprises a multiplexer configured to vary the voltage level of the reference voltage in response to a selection signal.

12. The display device of claim 9, wherein the common voltage compensator comprises:

a first multiplexer configured to vary the voltage level of the reference voltage in response to a first selection signal; and a second multiplexer configured to select either the output voltage of the first multiplexer or the voltage of the touch driving signal in response to a second selection signal.

13. The display device of claim 10, wherein the common voltage compensator comprises a multiplexer configured to vary the voltage level of the reference voltage in response to a selection signal.

14. The display device of claim 10, wherein the common voltage compensator comprises:

a first multiplexer configured to vary the voltage level of the reference voltage in response to a first selection signal; and a second multiplexer configured to select either the output voltage of the first multiplexer or the voltage of the touch driving signal in response to a second selection signal.

* * * * *